April 22, 1969 P. K. WALL 3,440,575
MULTI-CRYSTAL FILTERS EMPLOYING TRIFILAR OR DOUBLE BIFILAR WOUND WINDING TRANSFORMERS
Filed March 10, 1967 Sheet 1 of 4

Inventor
P. K. WALL
By O. P. Warner
Attorney

United States Patent Office 3,440,575
Patented Apr. 22, 1969

3,440,575

MULTI-CRYSTAL FILTERS EMPLOYING TRIFILAR OR DOUBLE BIFILAR WOUND WINDING TRANSFORMERS

Peter Kenneth Wall, London, England, assignor to International Standard Electric Corporation, New York, N.Y., a corporation of Delaware Filed Mar. 10, 1967, Ser. No. 622,198
Int. Cl. H01p *1/20*
U.S. Cl. 333—72 2 Claims

ABSTRACT OF THE DISCLOSURE

A transformer having three trifilar wound windings or two pairs of bifilar wound windings is employed in a crystal filter circuit to provide improved band-pass characteristics.

The invention relates to crystal filters using trifilar and double bifilar wound coils.

The invention will now be described with reference to the accompanying drawings, in which.

Figure 1:
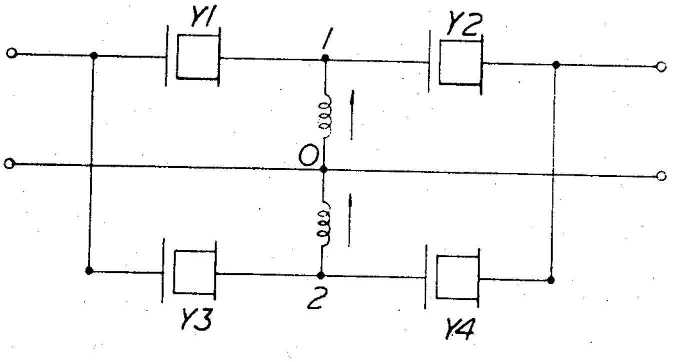
FIGURE 1 shows the circuit diagram of a commonly used crystal filter circuit.

The circuit diagram shown in the drawing according to FIGURE 1 shows a commonly used crystal filter circuit and comprises crystal units Y1 to Y4, for example, piezoelectric quartz crystals, which are connected in the form of a bridge arrangement. Across one diagonal of the bridge are connected two windings O1 and O2 which are bifilar wound in series onto the same magnetic core. The windings O1 and O2 divide the crystal filter into two crystal hybrid sections. The input to the crystal filter circuit is applied between the common junction of the windings O1 and O2 and one side of the other diagonal of the bridge while the output is taken from the other side of this diagonal and the common junction of the windings O1 and O2.

In this crystal filter arrangement it is necessary to have tight coupling between the two windings O1 and O2 if satisfactory stop band performance is to be achieved, and even then, considerable degradation of the stop band performance is caused by the leakage inductance and series resistance of the windings O1 and O2. If both of the crystal hybrid sections are intended to have an attenuation peak remote from the centre frequency of the filter, then at frequencies some distance away from the cut-offs, the crystals Y1 to Y4 will behave essentially as capacitances. A crystal filter designed to operate at a frequency of 10.7 mc./s. and having a bandwidth of 15 kc./s. would have input and output impedances of approximately 1 kilohm and the capacitance of each of the crystals would be 3 picofarads. If the transformer was working correctly, it should be possible to short together the remote ends 1 and 2 of the windings O1 and O2 and at frequencies well removed from the cut-offs the attenuation should remain high. If the remote ends 1 and 2 of the windings O1 and O2 are shorted together the circuit diagram shown in the drawing according to FIGURE 2A would result. The two windings O1 and O2 in this configuration are in antiphase.

It is difficult to produce coupling close enough to avoid residual inductance of better than 0.1 microhenry which has a reactance of approximately 7 ohms at a frequency of 10.7 mc./s.

Figure 2A:
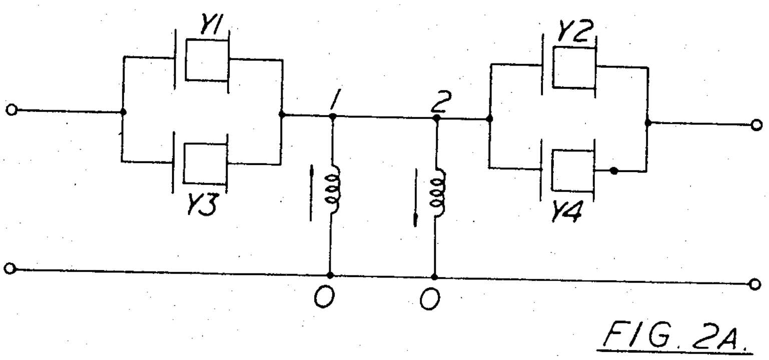
FIGURE 2A shows an arrangement of the circuit diagram shown in the drawing according to FIGURE 1 wherein the remote ends of the transformer windings are shorter together.
Figure 2B:
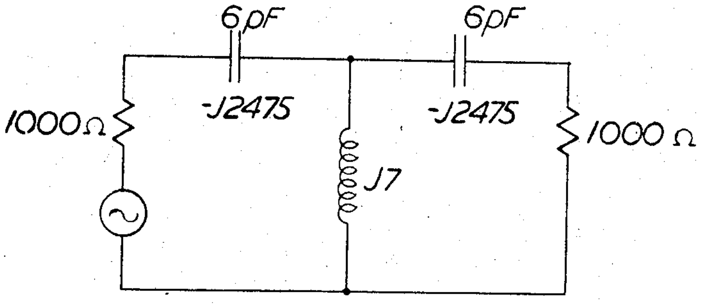
FIGURE 2B shows the equivalent circuit for the circuit diagram shown in the drawing according to FIGURE 2A, when designed to operate at a frequency of 10.7 mc./s. and having a bandwidth of approximately 15.7 kc./s.

The attenuation of the circuit diagram shown in the drawing according to FIGURE 2A can be calculated using the component parameters as given above and as illustrated in the equivalent circuit shown in the drawing according to FIGURE 2B.

The attenuation of this circuit is approximately of the order of 54 db instead of the theoretical value of infinity.

In practice, the filter would normally be operated at frequencies at which the attenuation is not necessarily intended to be virtually infinite and where the two sections of the crystal filter are not necessarily giving high attenuation at the same frequencies but nevertheless, it can be seen from the preceding analysis that attenuations much above 40 db will be considerably modified by the presence of imperfect coupling.

The invention provides a crystal filter circuit having two virtually independent crystal hybrid sections including four crystal units and a transformer having three windings which are star connected and trifilar wound, wherein one of said windings forms a common arm of a double bridge arrangement, wherein the other three arms of each of said bridge arrangements are formed by two of said crystal units in adjacent arms and one of the remaining transformer windings, wherein the input to said crystal filter circuit is applied between the common junction of said star connected windings and the junction of the crystal units in the first bridge arrangement while the output is taken from the junction of the crystal units in the second bridge arrangement and the common junction of said star connected windings.

The invention also provides a crystal filter circuit having two independent crystal hybrid sections including four crystal units and a transformer having four windings which are star connected and double bifilar wound, wherein each of said independent crystal hybrid sections which comprises two of said crystal units connected to form adjacent arms of a bridge arrangement, the other two adjacent arms of which are formed by two of said star connected windings, are connected together by the common junction of the star connected windings, wherein the input to said crystal filter circuit is applied between the common junction of said star connected windings and the junction of the crystal units in the first bridge arrangement while the output is taken from the junction of the crystal units in the second bridge arrangement and the common junction of said star connected windings.

According to one feature of the invention, said star connected windings are wound onto the same magnetic core.

Figure 3:
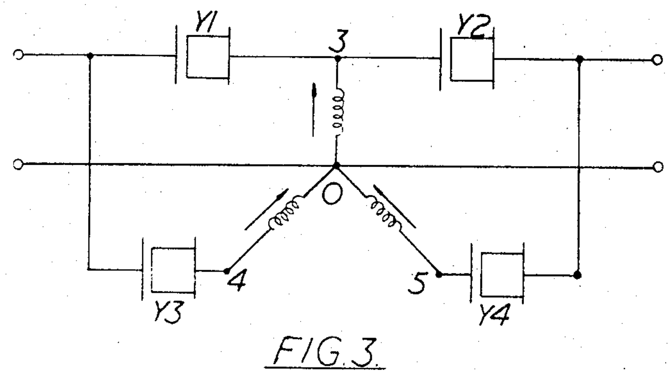
FIGURE 3 shows the circuit diagram of a crystal filter according to the invention which utilizes a trifilar wound coil.

Referring to FIGURE 3 the circuit diagram of a crystal filter which utilizes a trifilar wound coil is shown and comprises crystal units Y1 to Y4, for example; piezo-electric quartz crystals, which are connected to form a bridge arrangement. Across one diagonal of the bridge are connected three windings O3, O4 and O5 in a star configuration which are trifilar wound onto the same magnetic core. The crystal filter is divided into two sections with a common winding O3. The input to the crystal filter circuit is applied between the common junction of the three windings O3, O4 and O5 and one side of the other diagonal of the bridge arrangement while the output is taken from the other side of this diagonal and the common junction of the windings O3, O4 and O5.

There is a substantial capacitance between the remote ends 4 and 5 of the windings O4 and O5 but since they will remain at approximately the same potential at all frequencies, the effect of the capacitance will be negligible.

Figure 4:
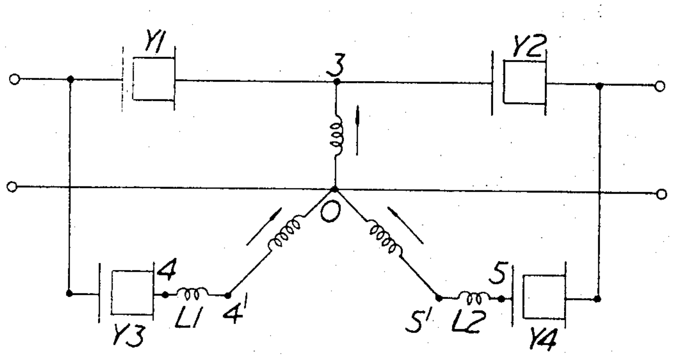
FIGURE 4 shows a representation of the circuit diagram shown in the drawing according to FIGURE 3 wherein the interwinding capacitance has been omitted.

It is possible by ignoring interwinding capacitance, to represent the circuit diagram shown in the drawing according to FIGURE 3 as shown in the drawing according to FIGURE 4. In this circuit the inductances L1 and L2 are drawn out as a mathematical artifice such that the remaining star of inductors is perfectly coupled. Since crystal filters are normally specified over relatively narrow percentage bandwidths, it is possible to absorb the inductances L1 and L2 into the crystal units Y3 and Y4 respectively, by modifying their parameters. Since the remaining star of inductors O3, O4′ and O5′ are perfectly coupled, the two halves of the filter circuit are thus capable of operating without interaction and very high attenuations can be realised.

Figure 5:
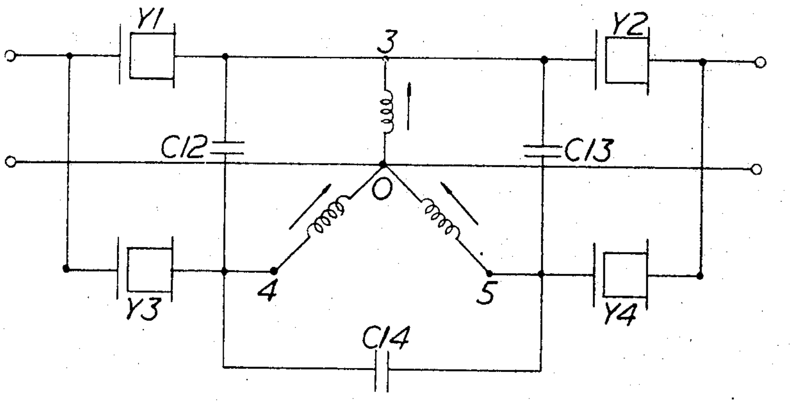
FIGURE 5 shows a representation of the circuit diagram shown in the drawing according to FIGURE 3 wherein the interwinding capacitance has been taken into account.

The circuit diagram shown in the drawing according to FIGURE 5 is representative of the crystal filter circuit when the interwinding capacitance is taken into account. The capacitances C12 and C13 which shunt the transmission path of the circuit can be accommodated, in order to neutralise their effect, by suitable choice of the inductance of the main windings of the transformer. The capacitance C14 is connected between the remote ends 4 and 5 of the two windings O4 and O5 and with perfect coupling the voltage appearing at the ends 4 and 5 would be equal, therefore the current in the capacitance C14 would be zero and the capacitance C14 would in these circumstances be rendered ineffective. When coupling is not perfect, there will be a small voltage difference across the capacitance C14 but this voltage will be a very small fraction of the voltage across the capacitance C12 (typically 5%). Furthermore, the impedance of the network facing the capacitance C14 is very low since the windings O4 and O5 are series opposing and the presence of the capacitance C14 therefore affects to a very small degree the voltage across it. The presence of the capacitance C14 is therefore in practice found to be negligible even due to its substantial size (typically 10 picofarads for a filter designed to operate at a frequency 10.7 mc./s.).

From the above analysis it is evident that the windings in the perfectly coupled transformer are not all equal after the removal of the inductances L1 and L2 as shown in the drawing according to FIGURE 4. This can to the first order, as previously stated, be allowed for by adjustment of the inductance of the crystal units Y3 and Y4 but may be obviated by the use of the circuit diagram shown in the drawing according to FIGURE 6.

Figure 6:
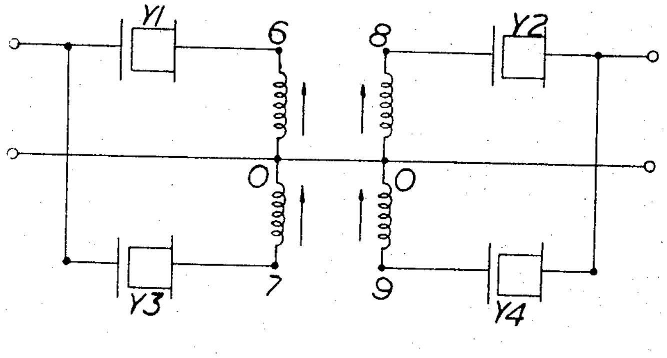
FIGURE 6 shows the circuit diagram of a crystal filter according to the invention which utilizes two bifilar wound coils.

The circuit diagram shown in the drawing according to FIGURE 6 shows a crystal filter circuit and comprises crystal units Y1 to Y4, for example piezo-electric quartz crystals, and a transformer having windings O6, O7, O8 and O9. The windings O6 and O7 are bifilar wound and the windings O8 and O9 are also bifilar wound, both pairs being wound onto the same magnetic core but not necessarily closely associated with one another. The windings O6 and O7 are connected in a bridge arrangement with the crystal units Y1 and Y3 while the windings O8 and O9 are also connected in a bridge arrangement with the crystal units Y2 and Y4. Both of the bridge arrangements are connected together by way of the common junction of O of the four winding star configuration. The input to the crystal filter circuit is applied between the common junction O of the four winding star configuration and the common junction of the crystal units Y1 and Y3. The output of the crystal filter circuit is taken from the common junction of the crystal units Y2 and Y4 and the common junction O of the four winding star configuration.

Figure 7:
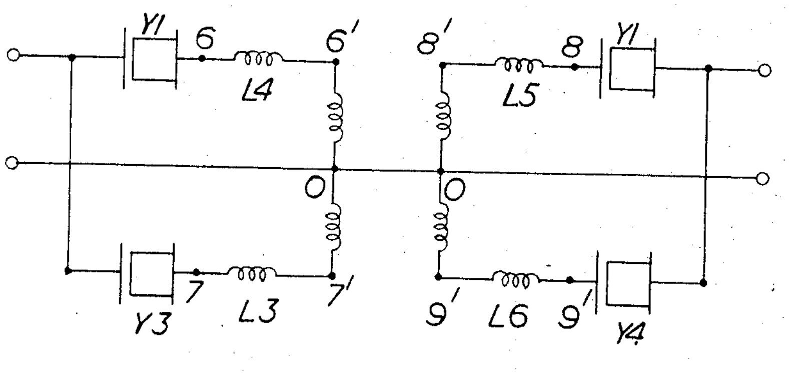
FIGURE 7 shows a representation of the circuit diagram shown in the drawing according to FIGURE 6 wherein the interwinding capacitance has been omitted.

By ignoring interwinding capacitance the circuit diagram as shown in the drawing according to FIGURE 6 may be represented by the circuit diagram as shown in the drawing according to FIGURE 7. The windings O6, O7, O8 and O9 would all need to be equal for efficient operation and therefore the inductances L3, L4, L5 and L6 which are drawn out as a mathematical artifice to leave a perfectly coupled coil would also be equal. The residual windings O6′, O7′, O8′ and O9′ are therefore all equal and provide a perfectly coupled residual coil.

The same arguments apply with regard to the interwinding capacitances having negligible effect on the performance of this circuit as they did with regard to the crystal filter circuit shown in the drawing according to FIGURE 4.

The preferred method of winding the four winding coil would be for windings O6 and O7 to be closely coupled together and for the windings O8 and O9 to be closely coupled together. Tight coupling between these two pairs is less important but an acceptable arrangement would be for all four windings to be wound together.

The preferred method of winding the three winding coil is for all three windings O1, O2 and O3 to be wound together as a trifilar winding.

Figure 8:
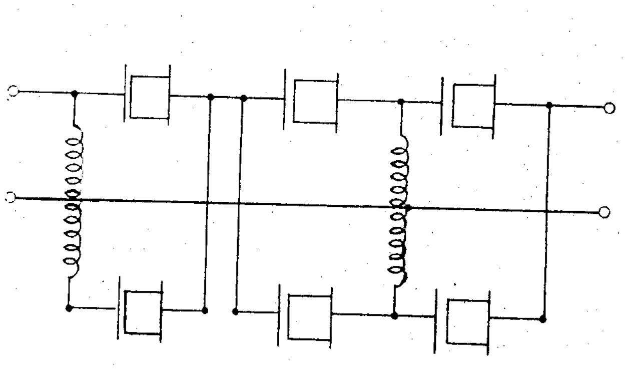
FIGURE 8 shows the circuit diagram of a crystal filter circuit arrangement.
Figure 9:
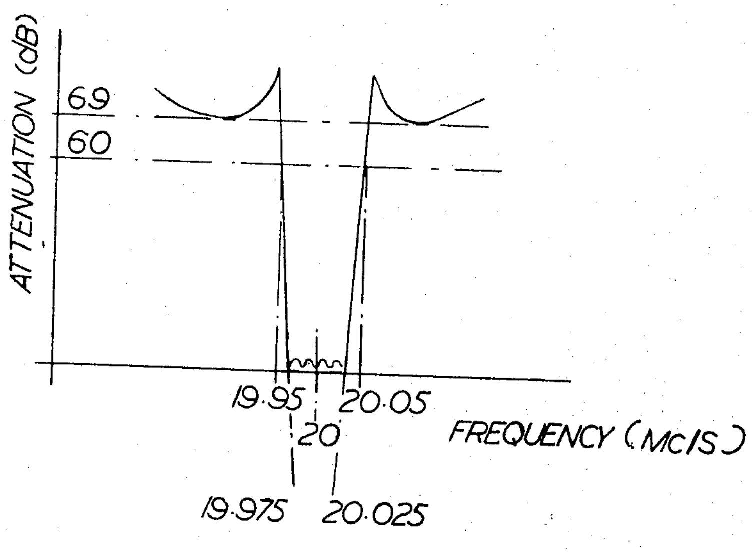
FIGURE 9 shows an attenuation-frequency curve for the circuit diagram shown in the drawing according to FIGURE 8.

Referring to FIGURE 9, an attenuation-frequency curve is shown for the crystal filter circuit shown in the drawing according to FIGURE 8. This crystal filter circuit which was designed to operate at a frequency 20 mc./sec. with a theoretical minimum attenuation of 69 db, in practice, actually produced a minimum attenuation in the region of 58 to 60 db. When the internal transformer was replaced with a three winding trifilar wound type as shown in the drawing according to FIGURE 3, the attenuation figure was improved to approximately 65 db minimum at the troughs.

In both the circuit diagrams shown in the drawings according to FIGURE 3 and FIGURE 6 a single transformer unit is used which employs only one magnetic circuit. However, at V.H.F. no actual magnetic material need be present in the circuit and the same principles of operation as outlined in preceding paragraphs would still apply.

While the principles of the invention have been described above in connection with specific apparatus and applications, it is to be understood that this description is made only by way of example and not as a limitation on the scope of the invention.

What is claimed is:

1. A crystal filter circuit operable over a narrow bandwidth comprising:

two crystal hybrid sections, said sections each including two crystal units and a common transformer, the transformer having three star connected and trifilar wound windings, one of said windings connected to form an arm between a common junctor and a connection between a first terminal of a crystal unit of each of said two crystal sections, the other two windings of said transformer each connecting said common junctor and a first terminal of another crystal unit in one o f said two crystals sections, input terminals of said filter circuit connected across the common junctor and a junction of the second terminals of the said crystal units in a first one of the hybrid sections, and output terminals of said filter circuit connected between the common junctor and a junction of the second terminals of the said crystal units in a second one of the hybrid sections.

2. A crystal filter circuit over a narrow bandwith comprising:

two crystal hybrid sections, said sections each including a common transformer and two crystal units coupled to windings of the transformer, the transformer having four windings formed as two bifilar wound pairs, a first of said bifilar wound pairs having a terminal in common at a junctor point and having separate terminals of each winding connected to separate first terminals of the crystal units of a first crystal section, the second bifilar wound pair having a terminal in common at said junctor point and having separate terminals of each winding connected to separate first terminals of the crystal units of a second crystal section, input terminals of said filter circuit connected across the common junctor and a common connection of second terminals of the crystal units in the first crystal section, and output terminals of said filter circuit connected across the common junctor and a common connection of second terminals of the crystal units in the second crystal section.

References Cited

UNITED STATES PATENTS

| | | | |
|---|---|---|---|
| 2,959,752 | 11/1960 | Kosowsky | 333—72 |
| 3,114,120 | 12/1963 | Heck | 336—170 X |
| 3,168,715 | 2/1965 | Woodworth | 336—170 X |
| 3,374,448 | 3/1968 | Hurtig | 333—72 |

HERMAN KARL SAALBACH, *Primary Examiner.*

T. J. VEZEAU, *Assistant Examiner.*

U.S. Cl. X.R.

333—77